United States Patent [19]

Altrieth, III

[11] Patent Number: 5,742,879
[45] Date of Patent: Apr. 21, 1998

[54] METHOD AND APPARATUS FOR REPRODUCING DOCUMENTS WITH VARIABLE INFORMATION

[75] Inventor: Frederick E. Altrieth, III, Scottsville, N.Y.

[73] Assignee: Eastman Kodak Company, Rochester, N.Y.

[21] Appl. No.: 976,913

[22] Filed: Nov. 16, 1992

[51] Int. Cl.⁶ .................................................. G03G 15/22
[52] U.S. Cl. ............................................ 399/139; 399/194
[58] Field of Search ................................... 355/200, 202, 355/210, 218, 244; 346/160

[56] References Cited

U.S. PATENT DOCUMENTS

| | | |
|---|---|---|
| 4,268,164 | 5/1981 | Yajima et al. |
| 4,417,805 | 11/1983 | Kishi. |
| 4,640,601 | 2/1987 | Deguchi et al. |
| 4,711,557 | 12/1987 | Watanabe. |
| 4,763,165 | 8/1988 | Watanabe. |
| 4,887,128 | 12/1989 | Jamali et al. |
| 5,030,995 | 7/1991 | Bolton. |
| 5,134,440 | 7/1992 | Nishimori. |
| 5,138,465 | 8/1992 | Ng et al. |

*Primary Examiner*—Sandra L. Brase
*Attorney, Agent, or Firm*—Norman Rushefsky

[57] ABSTRACT

Method and apparatus for optically reproducing information from an original document sheet together with electronically written additional information that may be either constant in content for all copies or may vary in content from copy to copy. Electrophotographic reproduction apparatus includes data entry apparatus for reading in the sets of variable information data items defining the electronically written information and is operable to format a template of one or more patches defining a minimal template area in which the variable information may be electronically reproduced onto the document without unnecessarily obscuring the optically reproduced information. Optionally, the template may be displayed to the operator who may format the size, style and font of alphanumeric and symbolic information in order to achieve a desired appearance on the composite copy. The original document sheet or a copy thereof is then placed on a digitizing tablet, and the operator may select the coordinates on the document of the template within which the electronically written, variable information is to be reproduced. The document sheet is then placed on the exposure platen and the document information is optically copied together with the electronically reproduced minimal size template onto an intermediate master having a black patch (es) corresponding in shape and placement to the template. If acceptable to the operator, the intermediate master is again placed on the exposure platen and optically reproduced in a first image frame while the variable information is electronically exposed by an LED print head on the same or a second image frame, and a composite copy is made. In the case of single or multiple copies of documents with constant additional information, the composite copies are made with a fixed template corresponding in size and shape to the formatted information. In the case of single or multiple copies of documents with variable additional information, the composite copies are made with a fixed template of an area sufficient to accommodate the additional information which occupies the greatest space.

13 Claims, 8 Drawing Sheets

METHOD AND APPARATUS FOR REPRODUCING DOCUMENTS WITH VARIABLE INFORMATION

BACKGROUND OF THE INVENTION

1. Field of the Invention

The present invention relates to electrophotographic reproduction apparatus and methods and, more specifically, to improvements in reproducing documents with variable information using supplementary electronic writers.

2. Brief Description of the Prior Art

In the prior art as exemplified by U.S. Pat. Nos. 4,268,164 and 4,887,128, apparatus is described for producing composite optical and electronic reproductions of an original wherein the optical reproductions contain additional variable information, electronically written ("VIEW") in. Such reproductions may the form of letters wherein the body of the letter is the same for all the reproductions, but variable information such as addresses or the like will differ from copy to copy in a set of reproductions. In order to accomplish this, the prior art apparatus employs black cover papers or the like which are used to cover the areas on the original corresponding to those where the variable information is to be written the original with the areas appropriately masked is placed on the exposure platen and a scanning reproduction is made wherein a predetermined time is provided for the copying reproduction of the optically reproduction of document portions and a predetermined time is provided for the reproduction of the variable information employing a laser beam scanner, light emitting diode (LED) linear array, or the like.

In the '128 patent, incorporated by reference in its entirety, an apparatus and method for producing copies with a composite of constant information from an original and additional variable information is disclosed wherein the apparatus operates in one embodiment in accordance with a method comprising the steps of: (a) placing the document or a copy thereof on a digitizing tablet and identifying area(s) to receive the variable information by having the operator manually select a point or points that identify an area to receive variable information, the selection step causing signals to be created with respect to such points that define a fixed area template of a selected shape; (b) placing the document to be copied on an exposure platen; (c) optically exposing the document onto an image frame of an electrostatically charged photoconductive member to form an electrostatic latent image; (d) in response to signals generated in step (a), separately exposing using an electronic print source onto the same image frame a blank fixed area template in the selected area and exposing onto a second image frame a complementary exposure to said fixed area template; (e) developing the latent images formed by the two image flames; (f) transferring the developed images to a receiver sheet to form an intermediate master copy with the blacked out fixed area template printed as a black patch on the copy with any information in the area of the template being erased; (g) placing the master copy on an exposure platen; (h) optically exposing the master copy onto an image frame of an electrostatically charged photoconductive member to form an electrostatic latent image; (i) in response to variable information data signals from a data base or other input source, separately exposing, using the electronic print source, onto the same image frame an electrostatic latent image of character information in the area frame corresponding to the fixed area template; (j) developing the latent images formed by the image frame; (k) transferring the developed image to a receiver sheet to form the copy with the composite information; and (l) repeating steps (h)–(k) until all copies are completed for all variable information data signals.

For example, by operating the photocopying apparatus in this fashion, a data base of addressees may be loaded into the memory of the printer and retrieved in sequence to print customized addressee information on a standardized letter or promotional piece or the like at high speed. The operator can decide where to insert the variable information by using the digitizing tablet and wand to define the $X_i$, $Y_i$ coordinates and the size of the fixed area template. Trial masters may be generated and viewed in the process of selecting a desired size, rectangular template.

With reference to FIG. 1A, it illustrates a master copy 10 reproduced from an original document sheet using the above-described method of the prior art and containing information 12 to be reproduced that has one or more templates 14 thereon in the form of a black patch formed with toner. The document 10 is used as a master, wherein the black patch area represents a template within which additional variable information is printed in accordance with one embodiment of the above-incorporated '128 patent. FIG. 1B illustrates a reproduction 20 of the master copy 10 and includes a reproduction 22 of the information 12 on the master copy from the original (the constant information) and additionally includes a reproduction of variable information 24 which may comprise address information, salutations, etc., that change from copy to copy, of a letter or a document that is to be sent to many different individuals in the boundaries defined by the template 14 of FIG. 1A.

Thus, for purposes of explanation herein, a "template" is generally meant to indicate the area within which VIEW data items are to be printed, whereas a "patch" means the blacked out manifestation of the template or a portion of the template that is created on the master copy which is subsequently used in making the composite copies or prints including the VIEW data items. A rectangular template may re represented by a set of x, y coordinates for each of the corners of the area in which the patch is to appear on a master.

Often, it is desirable to customize a pre-existing document by placing variable information on it that by its size and format necessarily obscures part of the constant information of the document. The problem is accentuated with the use of a fixed area template such as is shown in FIG. 1A chosen generously to be certain that it provides enough space to accommodate all of the variable information, the parameters of which may not be known in large volume data sets. This makes it difficult to position the fixed area template and increases the time that it takes to make the size, shape and positioning decision.

SUMMARY OF THE INVENTION

It is, therefore, an object of the invention to provide a highly productive reproduction apparatus for providing reproductions of originals with both constant and variable information.

It is a further object of the invention to provide a reproduction method and apparatus for providing reproductions of originals with both constant and variable information and wherein the locations of the constant and variable information are more flexible than suggested by the prior art apparatus.

It is a still further object of the present invention to provide a reproduction method and apparatus wherein the variable information is written over an area of the constant information that is automatically defined from the variable information to avoid unnecessary masking of the constant information.

In accordance with a first embodiment of the invention, a method and apparatus is provided for producing a master from which a set of copies may be made that are a composite of constant information from an original document and a set of additional variable information data items, the method and apparatus comprising the steps of and means for: (a) processing the set of variable information data items to identify an area in which the set of information data items to be printed may be printed; (b) formatting a template corresponding to the area sufficient to accommodate the additional variable information data items to be printed; and (c) printing the set of data items in the formatted template superimposed on a reproduction of the constant information on the original document on copies made therefrom.

In accordance with the another principal aspect of the above objects, the invention is directed to apparatus and methods for producing composite copies of constant information from an original document and a set of additional variable information data items of the type which, when printed, constitute one or more lines of print characters, wherein the apparatus operates in one embodiment in accordance with a method comprising the steps of: (a) processing the set of variable information data items to identify the largest lines of print characters among the sets of information data items to be printed on the set of copies to be made; (b) formatting a template to accommodate the largest lines of print characters among the set of information data items to be printed; and (c) printing the set of data items in the formatted template on the set of copies.

The preferred embodiment of the method and apparatus of the invention operates to print by: (d) selecting the area(s) on the original document to receive the variable information template of the selected shape; (e) placing the document to be copied on an exposure platen; (f) optically exposing the document onto an image frame of an electro-statically charged photoconductive member to form an electrostatic latent image; (g) using an electronic print source to separately expose onto a different image frame the template in the selected area; (h) developing the latent images formed in the image frames; (i) transferring the developed images to a receiver sheet to form an intermediate master with a black patch or patches in the template area printed on the intermediate master and obscuring any optically copied constant information in the area of the template; (j) placing the master on an exposure platen; (k) optically exposing the master onto an image frame of an electro-statically charged photoconductive member to form an electrostatic latent image; (l) in response to variable information data items from a data base or other input source for the set of data items, separately exposing, using the electronic print source, an electrostatic latent image of character information on the photoconductive member in the minimum area template; (m) developing the latent images; (n) transferring the developed images to a receiver sheet to form the copy with the composite information; and (o) repeating steps (k)-(n) until the full set of copies for the full set of variable information data items is made.

The apparatus and method thus may be used to make single or multiple composite copies with a single variable information data item or a set of variable information data items occupying that same area template.

Additionally, the characters in the data set to be printed and the formatted template may be displayed on a screen for operator viewing after sorting and formatting for the largest area template at each step in the operation of the printing apparatus.

BRIEF DESCRIPTION OF THE DRAWINGS

These and other objects, advantages and features of the present invention will become apparent from the subsequent description of the preferred embodiments of the present invention which refers to the attached drawings wherein.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art.

Figure 1A:
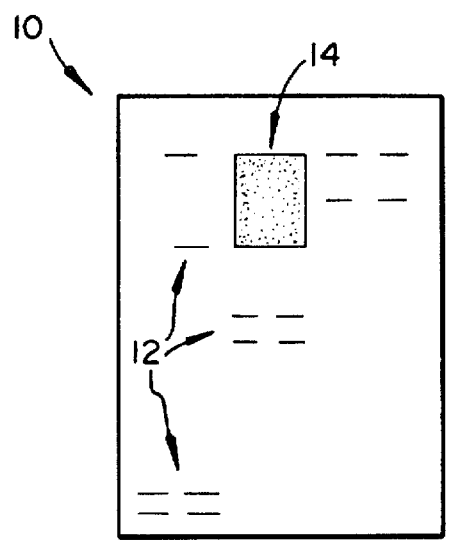
FIG. 1A is an illustration of a master copy of an original document sheet showing a portion thereof overwritten with a black patch to denote an area thereof corresponding to where variable information is to be placed in accordance with the teachings of the prior art.
Figure 1B:
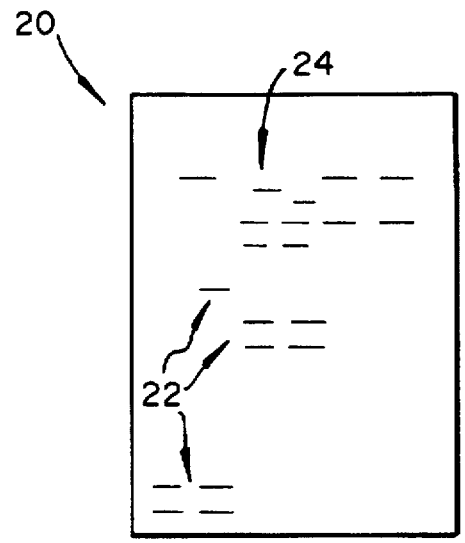
FIG. 1B is an illustration of a reproduction formed in accordance with the prior art having information reproduced from the original document sheet (constant information) and additional information written thereon (variable original information)
Figure 1C:
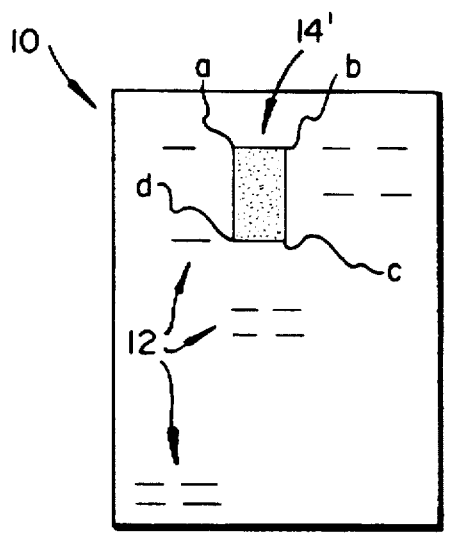
FIG. 1C is an illustration of a master copy of an original document sheet showing a black patch thereof within a template area sized to accommodate the longest line of print characters among the set of variable information data items, each data item comprising three lines of characters to be printed.
Figure 1D:
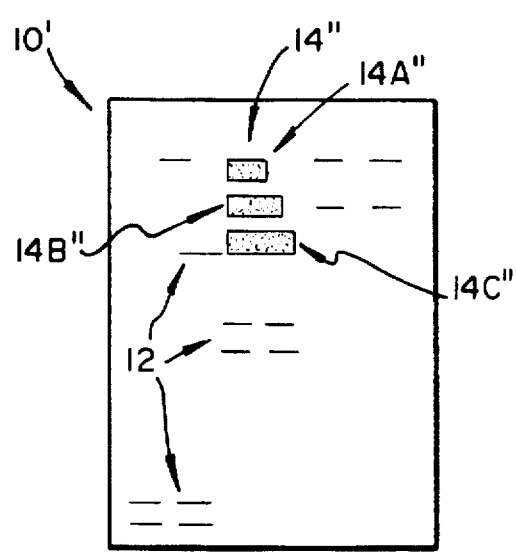
FIG. 1D is a further illustration of a master copy of an original document sheet showing black patches thereof within a template area, the black patches each sized and shaped to accommodate the longest line of print characters among the set of variable information data items, each data item comprising three lines of characters to be printed.

Turning to the drawings, FIGS. 1C and 1D illustrate how the present invention provides minimally invasive templates or patches on copies made from master documents through pre-sorting of the data in a given set of variable information. Since typical variable information sets are addressee information data items, the description herein will assume this type of information, although the variable information data items need not be limited to addressee information.

FIG. 1C is an illustration of a master copy of an original document sheet showing portions thereof overwritten with a single template formed as a black patch and sized to accommodate the largest composite variable information data items in a set of such data items having three lines of characters to be printed. FIG. 1D is a further illustration of a template formed as three black patches sized to the length of the longest lines of print for each of three lines of printed addressee information. The template 14" may specify a plurality, e.g. three, individual, separate black patches 14A", 14B", 14C", whereas template 14' comprises a single, rectangular shaped patch. Both templates 14' and 14" have a straight, left border consistent with addressing convention. The right border of the template 14' is established, in a first patch creation mode, as a straight line set at a distance from the right border that depends on the length or size of the largest character print line of all of the print character lines that is to be printed from the set of VIEW data items. Thus, template 14' of FIG. 1C differs from template 14 of FIG. 1A in that it is set automatically as a function of the VIEW data items and not by the operator.

The right border of template 14", on the other hand, is irregular since the length of each patch is set in accordance with a further patch creation mode by processing the print character line data in the set of VIEW data items so that respective lengths of each patch is sufficient to provide space for all of the printed character lines. The patches 14A", 14B", and 14C" are illustrated as discrete and separated, but it will be understood that the width of the patches may overlap, resulting in a single patch with an irregularly shaped left border. The templates 14 and 14' are coextensive in area with their respective patches, which may not be the case in respect to template 14".

Figure 2:
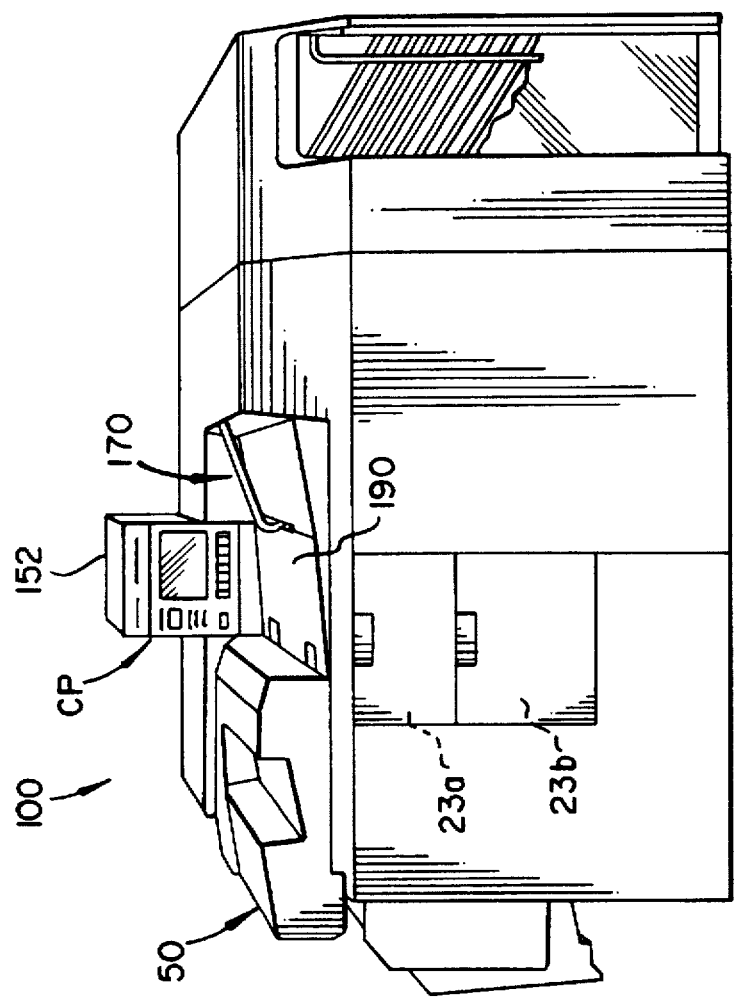
FIG. 2 is a perspective view of an electrophotographic apparatus in which the improvement of the present invention may be implemented.
Figure 3:
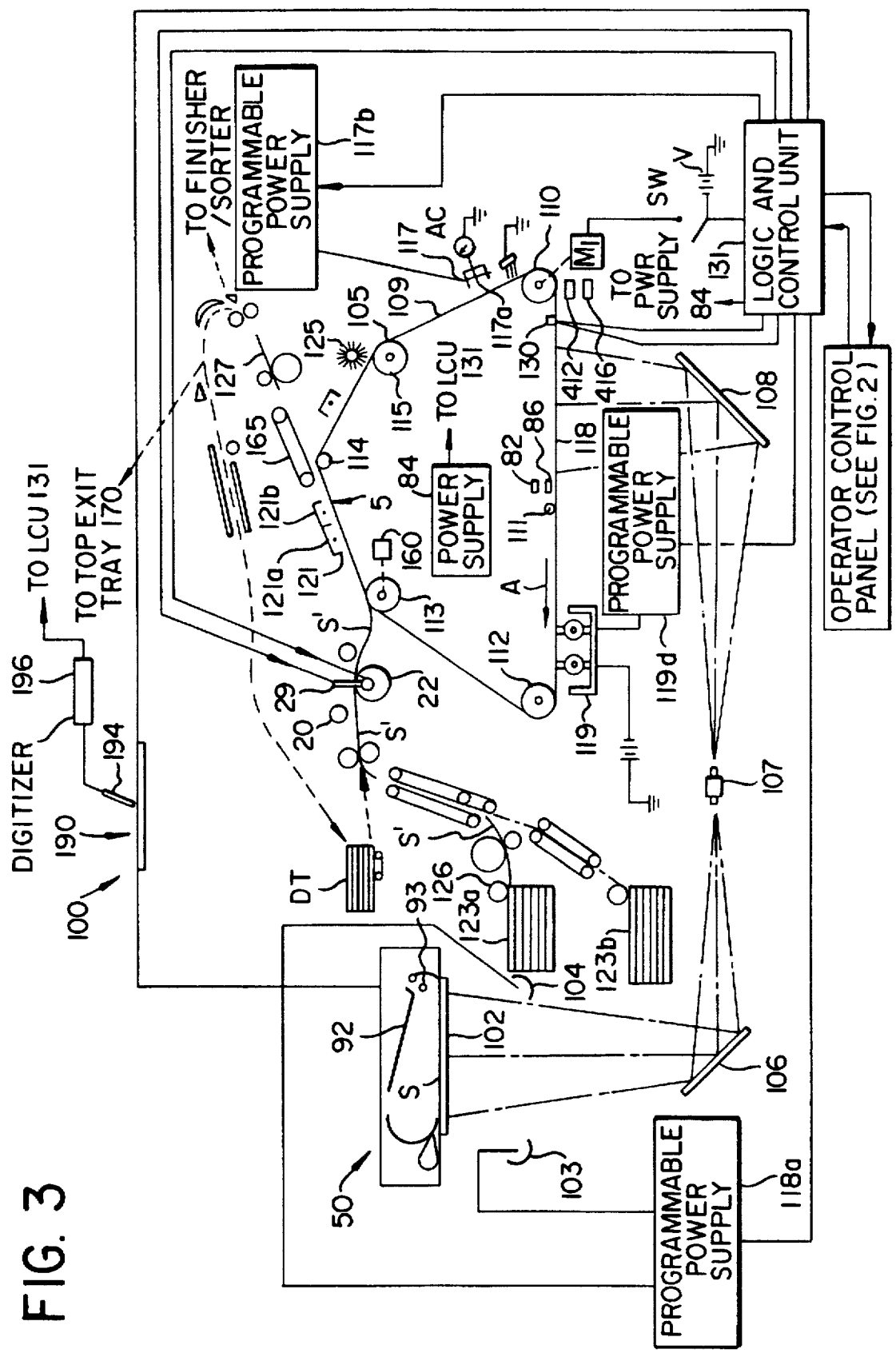
FIG. 3 is a side view schematic illustration of the operating elements of the electrophotographic reproduction apparatus of FIG. 2.
Figure 4:
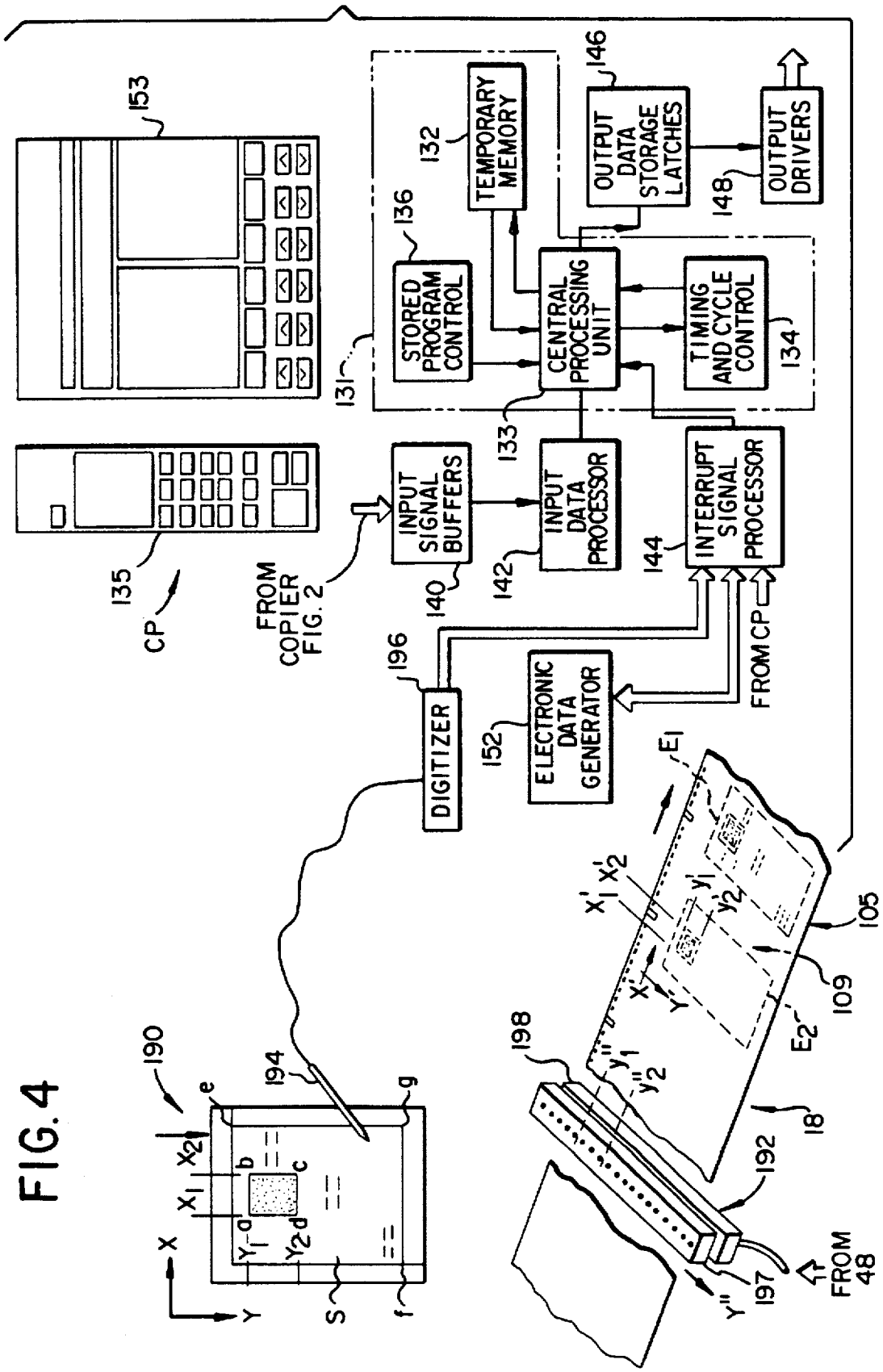
FIG. 4 is a schematic illustration of a data input station and block diagrams of controls for controlling the apparatus of FIGS. 2 and 3.
Figure 5:
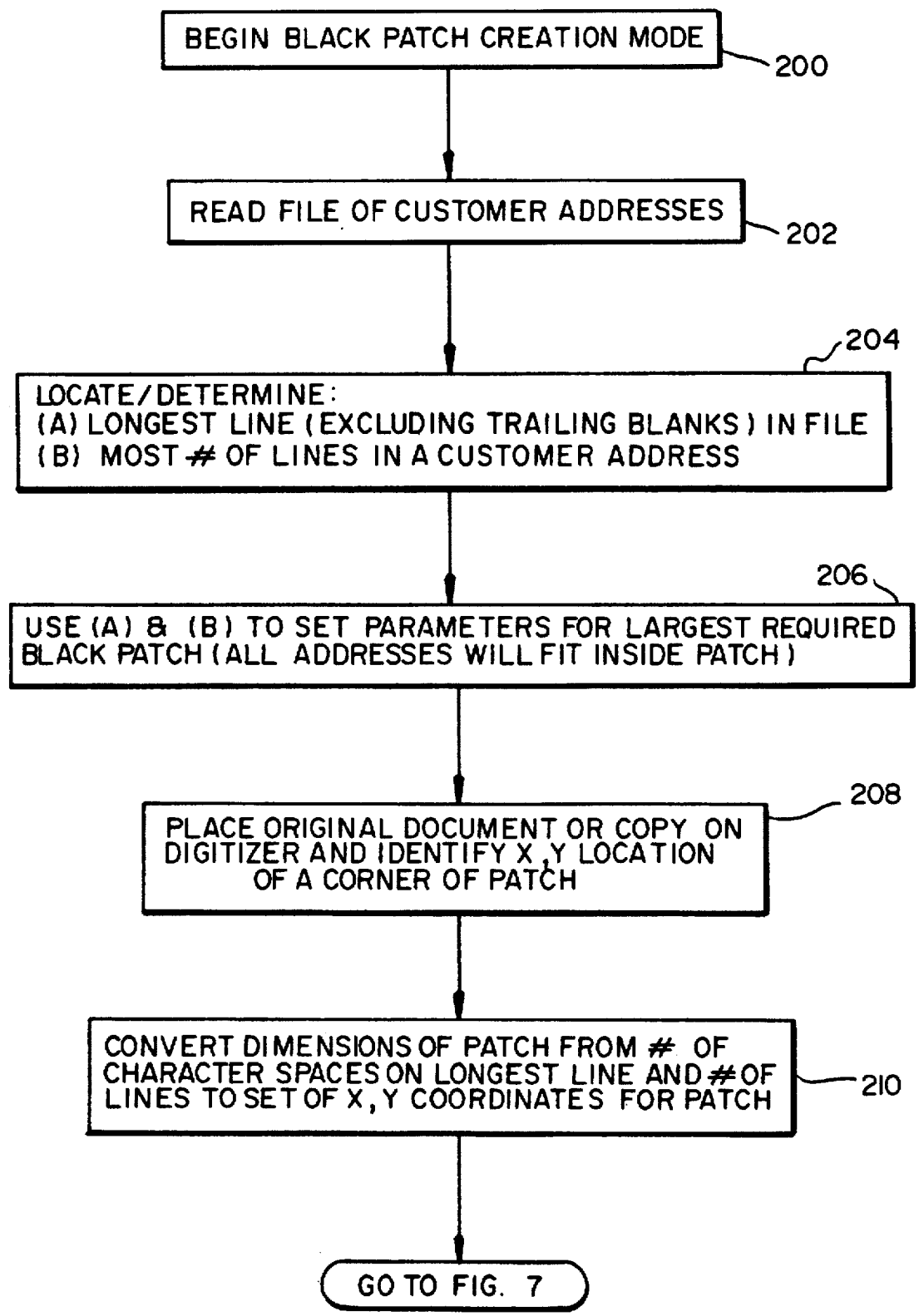
FIG. 5 is an illustration of the patch formatting steps of the patch creation mode for creating a master copy of the type shown in FIG. 1C for use in the printing of the set of VIEW data items in accordance with one embodiment of the invention.
Figure 6:
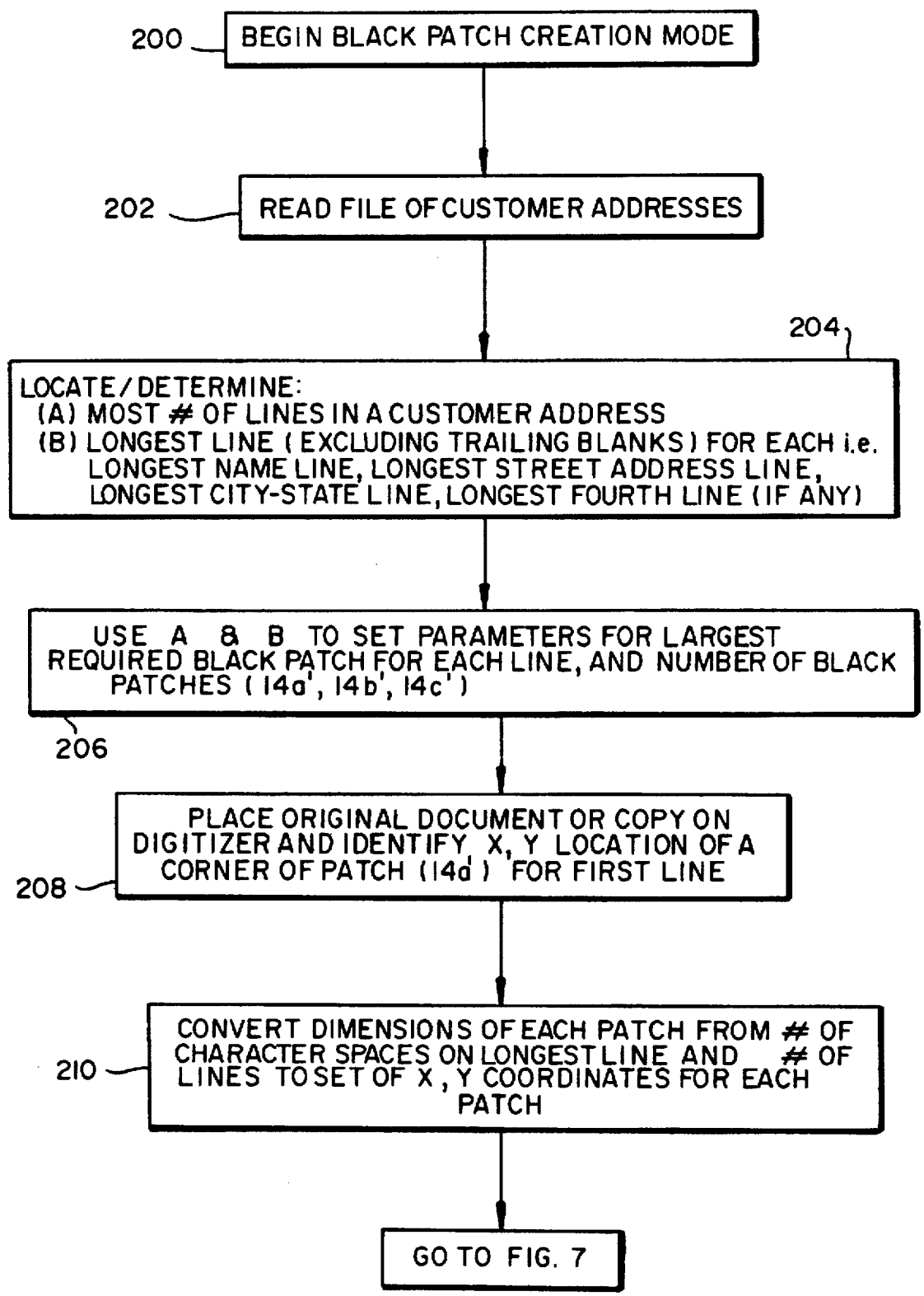
FIG. 6 is an illustration of the patch formatting steps of a further patch creation mode for creating the master copy of the type shown in FIG. 1D for use in the printing of the set of VIEW data items in accordance with a further embodiment of the invention.
Figure 7:
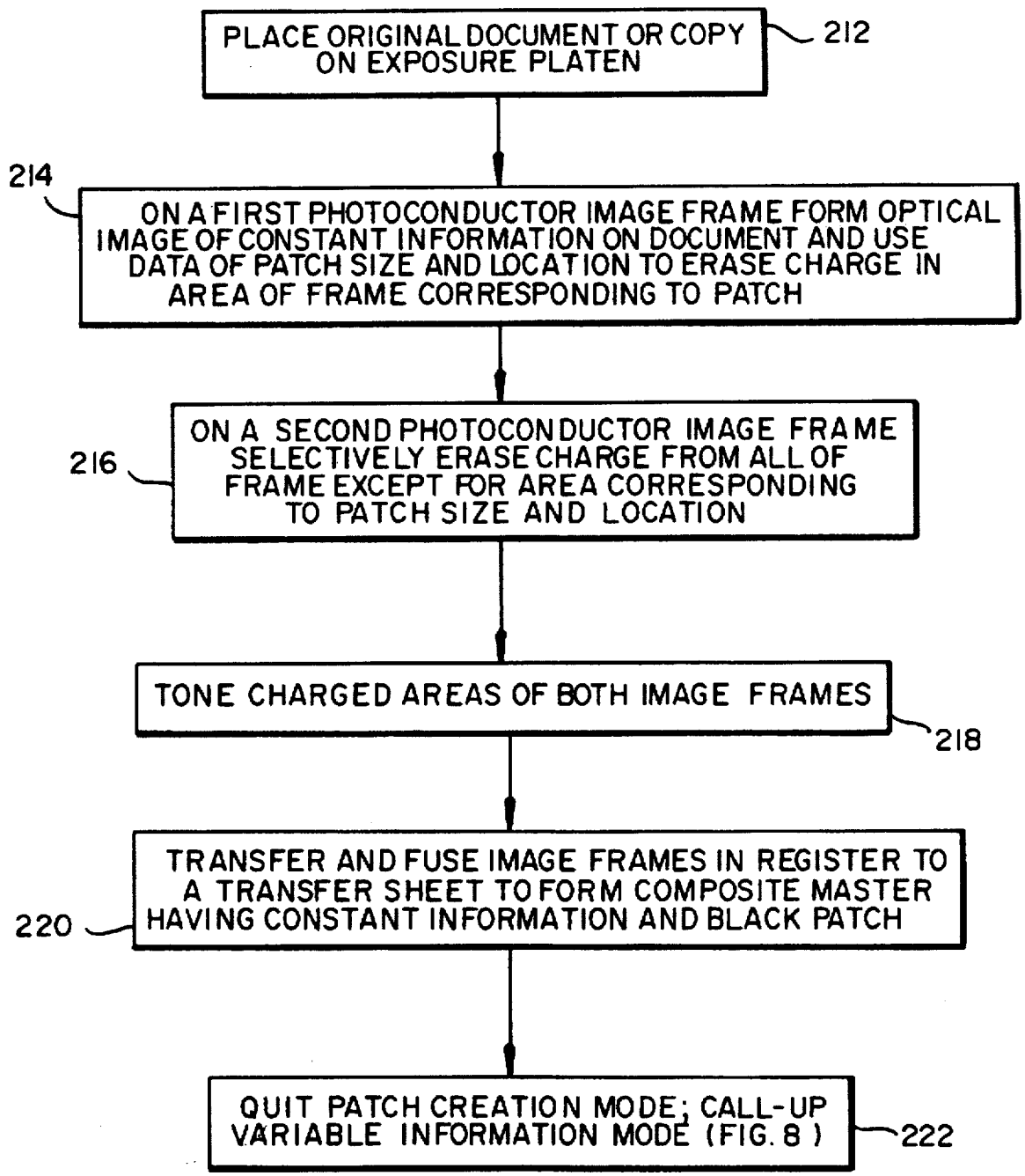
FIG. 7 is an illustration of the printing steps for printing a master copy with the formatted patches of FIGS. 5 or 6.
Figure 8:
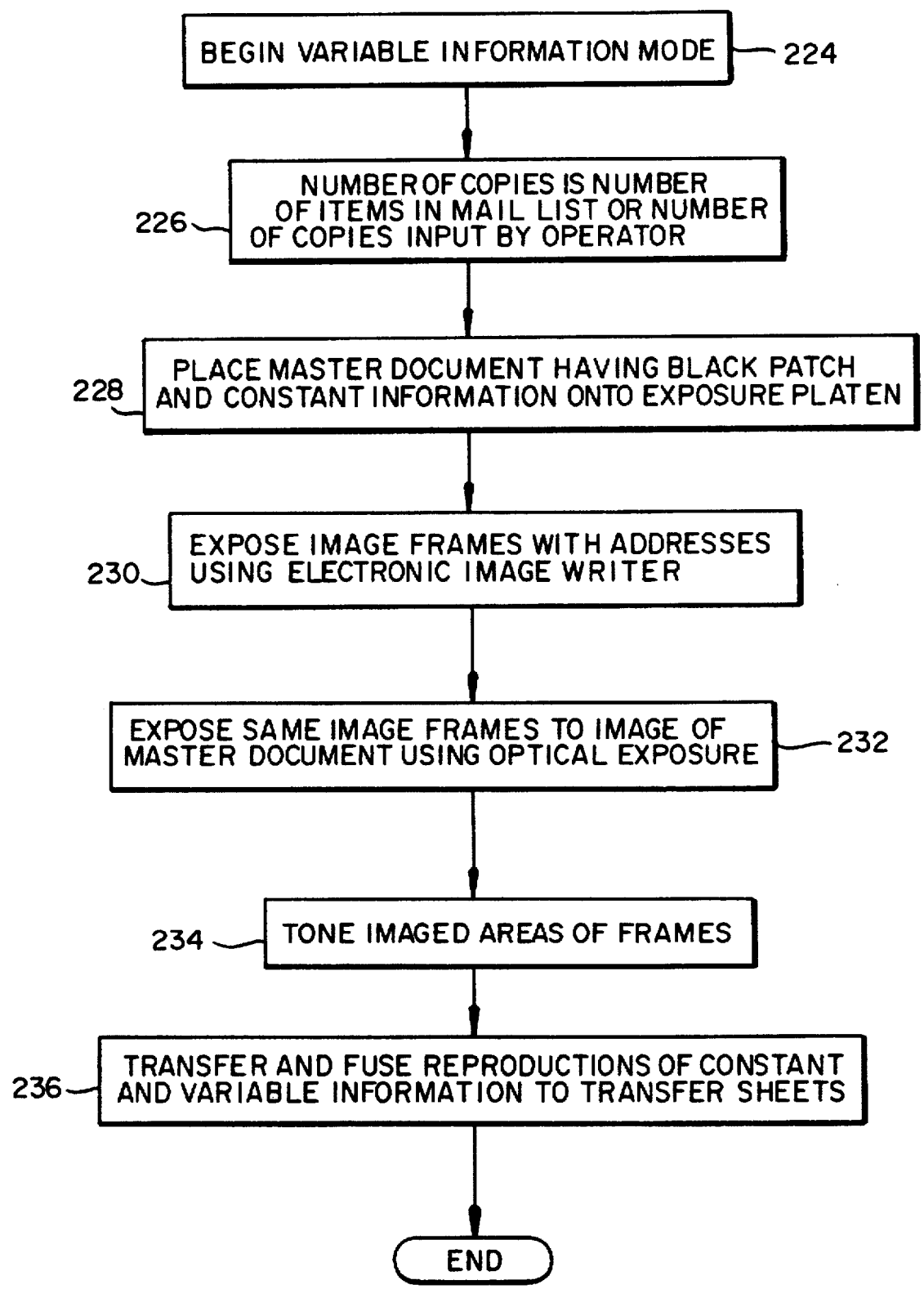
FIG. 8 is a flow chart of the method for reproducing copies from the master copy and the set of VIEW data items in accordance with the invention.

Referring now to FIGS. 2–4, they depict an apparatus 100 which is adapted, in accordance with the present invention, to produce electrophotographic reproductions of documents including a composite of constant and variable information, wherein the variable information is printed over the constant information in an area of minimum size as illustrated, for example, following the steps set forth in FIGS. 5 through 7.

As shown in FIG. 3, the electrophotographic reproduction apparatus or copier 100 includes an endless or continuous belt-type photoconductive web 105 that is trained about six transport rollers 110, 111, 112, 113, 114, and 115. Roller 110 is coupled to a drive motor $M_1$ in a conventional manner. Motor $M_1$ is connected to a suitable source of potential (V) when a switch (SW) is closed by a signal from logic and control unit (LCU) 131. When SW is closed, the roller 110 is driven by the motor $M_1$ and moves the web 105 in a clockwise direction as indicated by arrow A. This movement causes successive image sectors or flames of the web 105 to sequentially pass a series of electrophotographic work stations of the copier.

For the purpose of the instant disclosure, several copier work stations are shown along the web's path. First, a primary charging station 117 is provided at which the photoconductive surface 109 of the web 105 is sensitized by applying to such surface a uniform electrostatic primary charge of a predetermined voltage. The station 117 includes an A.C. corona charger shown as a three wire A.C. charger. The output of the charger is controlled by a grid 117a connected to a programmable power supply 117b. The supply 117b is in turn controlled by the LCU 131 to adjust the voltage level Vo applied onto the surface 109 by the charger 117.

At optical exposure station 118, a light image of a document sheet original S supported on exposure platen 102 is projected onto the photoconductive surface 109 of the web 105 via mirrors 106, 108 and lens 107. The projected image dissipates the electrostatic charge at the light exposed areas of the photoconductive surface 109 and forms a latent electrostatic image. A recirculating feeder (RF) 50 or document positioner (DP) may be used to feed document originals to the exposure platen. A programmable power supply 118a, under the supervision of the LCU 131, controls the intensity or duration of light from flash lamps 103 and 104 to adjust the exposure level E incident upon the web 105.

An electronic illumination source 192 is also provided facing the photoconductive surface 109 which comprises a plurality of light emitting diodes (LEDs) 198 arranged in a row. These LEDs are coupled to the output drivers 148 of the LCU 131 to expose the surface 109 to create the template for the intermediate master and to expose the surface to the set of variable information data items to be reproduced. A SELFOC (trademark of Nippon Sheet Glass Company, Ltd.) gradient index lens array (GRIN) 197 is located proximate the web and is directed transverse to the direction of web movement. The GRIN 197 focuses the light from the LEDs onto the surface 109 of the web. The LED print head 192 may be located as shown after the exposure area 118 or more preferably before the exposure area such as opposite roller 110. The important consideration being that it be located between charger station 117 and development station 119.

A magnetic brush developing station 119 includes developer which may consist of iron carrier particles and electroscopic toner particles with an electrostatic charge opposite to that of the latent electrostatic image. Developer is brushed over the photoconductive surface 109 of the web 105 and toner particles adhere to the latent electrostatic image to form a visible toner particle, transferable image. Other development systems than the one shown may be used; for example, see commonly assigned U.S. Pat. No. 4,473,029 to Fritz et al and U.S. Pat. No. 4,546,060 to Miskinis et al. A programmable power supply 119d may be provided to adjust the level of $V_B$, the voltage level applied to an electrode located in the station 119.

The copier 100 also includes a transfer station 121, shown as corona chargers 121a and 121b, at which the toner images on web 105 are transferred to a copy sheet S' fed from a supply such as 123a or 123b and a cleaning station 125, at which the photoconductive surface 109 of the photoconductive layer is cleaned of any residual toner particles remaining after the toner images have been transferred and otherwise treated to restore its usefulness for the next exposure cycle. After the transfer of the unfixed toner images to copy sheet S', such sheet is transported to a heated pressure roller fuser 127 where the images are fixed to the copy sheet S'.

To coordinate operation of the various work stations 117, 118, 119, 121, 125 and 192 with movement of the image areas on the surface 109 past these stations, the web 105 has a plurality of perforations along one of its edges. These perforations generally are spaced equidistantly along the edge of the web 105. For example, the web 105 may be divided into six image sectors or frames by F perforations.

and each image area may be subdivided into 51 sections by C perforations. The relationship of the F and C perforations to the image areas is disclosed in detail in commonly assigned U.S. Pat. No. 3,914,047. At a fixed location along the path of the web movement, there is provided suitable means 130 for sensing web perforations. This sensing produces input signals into the LCU 131 which has a digital computer, preferably a microprocessor. The microprocessor has a stored program responsive to the input signals for sequentially actuating then de-actuating the work stations as well as for controlling the operation of many other machine functions. An encoder 160 associated with the roller 113 or with roller 110 also produces timing signals for the logic and control unit 131. The signals from the encoder cause the unit 131 to fine tune the process.

Turning now to FIG. 4, a block diagram of logic and control unit (LCU) 131 is shown which interfaces with the copier 100. The LCU 131 consists of temporary data storage memory 132, central processing unit 133, timing and cycle control unit 134, and stored program control 136. VIEW data input and output from generator 152 is performed sequentially under program control. Input data are applied either through input signal buffer 140 to an input data processor 142 or to an interrupt signal processor 144. The input signals are derived from various switches, sensors, and analog-to-digital converters. The output data and control signals are applied to storage latches 146 which provide inputs to suitable output drivers 148, directly coupled to leads. These leads are connected to the work stations and to a copy sheet registration feeding mechanism 126.

A keypad 135 is shown connected to the interrupt signal processor 144. This keypad 135 can be conveniently located on the operator control panel CP, and all its buttons provide inputs into LCU 131. In response to an input from a star (*) button or other special function button, a numeric code may be input into the LCU to call up a stored program for performing the type or mode of copy operation outlined in FIGS. 5-8. Attentively, selection of such a mode may be made by a computer driven menu displayed on display 153 which comprises an output display screen for the LCU 131.

A typical operation of the apparatus is described in the above-incorporated '128 patent. With regard also to FIG. 2, an operator first places the original document sheet S (or a copy thereof) to be copied onto a digitizing tablet 190. A corner of the document sheet is registered in one corner of the digitizing tablet to establish a coordinate reference system for inputting information into temporary memory 132 regarding the location relative to a reference on the apparatus of the areas of the document sheet to contain the variable information. To enable the LCU 131 to receive this information as indicated above, the keypad 135 is provided on the operator control panel and connected to interrupt signal processor 144. The starred (*) button thereof is used in conjunction with a numerical code inputted by the operator through depression of particular numerical buttons on the keypad.

When the appropriate code is provided, a program stored in stored program control 136 is called up and through a CRT or other display 153 (CP in FIG. 4) requests that the operator indicate with use of a digitizing wand 194 associated with the digitizing tablet the position, relative to the registered corner of the document sheet, of the continuous tone or black patch areas to be created on the master copy. The prior art manner of selecting the area 14 is described in detail in the '128 patent. Generally speaking, for each rectangular marked area 14 shown in FIGS. 1A and 4, the wand 196 may be used to touch the original sheet at one or more of the four corner points a, b, c, d, of each area. A digitizer controller 196, knowing the time of emitting of the signals and their receipt, can through triangulation principles calculate the x, y location of a point on the platen relative to a known reference point on the tablet such as the upper-left corner shown in FIGS. 1A and 4.

If there is another area to be reproduced with variable information, the operator moves the wand 194 and touches the points designating these areas on the document sheet S. This information is also stored and may be displayed on the display 153 by pressing a suitable button on the CP.

In order to display the appropriate size relationship between the area to be screened and the size of the document sheet, the computer control for the digitizer may be programmed to permit entry of data regarding document size, either through buttons pressed on the keypad 135 or by allowing the operator to input this information by touching document sheet S, positioned on the digitizing tablet 190, at corner points e and f (or only corner point g) with the wand 194. Alternatively, where only one size document sheet original will be used with the apparatus, the size of the document sheet may be stored in the stored program control memory 136.

Before use of the wand 194 for each input, the operator will first identify the type of input by pressing for example a format input button on the CP or respond directly to menu prompt commands indicated on the display screen 153.

A disc drive is provided as part of an electronic data generator 152 (FIGS. 2 and 4) to permit a set of variable information or VIEW data items, such as address lists and names, to be input directly. In accordance with the present invention, the operator need only identify, using the digitizing tablet, one corner a of the area to which the variable information is to be placed.

Where multiple areas on each copy are to contain VIEW data, the program may provide for input of multiple sets of the variable information data items in various orders. For example, the program may request the operator to identify the variable information that is to go into one area for each copy, and then request the operator to identify the variable information that is to go into each copy for another area.

The star button with a code number or other means such as a menu prompt on display CP and inputs from keypad 135 select either patch creation mode of FIG. 5 or 6. After selection of the patch creation mode (steps 200, 200'), the variable information data items are input using the keypad and the disk drive and the information is retained in temporary memory 132 in conjunction with this particular document sheet S and processed in accordance with steps 204–210 or 204'–210'. When the patch creation mode is called up with signals from keypad 135, a computer program in stored program control 136 outputs instructions via drivers 148 to display 153 to inform the operator to place the original on the digitizing tablet and enter the size of the original and the location of the area using the digitizing wand 194 as described previously (steps 208, 208').

In accordance with the present invention, it is not necessary to identify the points b, c, d because the variable data set itself is employed to define the size and shape of the minimal patch or patches necessary to accommodate the longest or largest print line for each line to be printed to arrive at the patches 14' or 14" illustrated in FIGS. 1C and 1D. Instead, the steps shown in FIGS. 5 or 6 are followed in relation to the apparatus as described and shown in the '128 patent to define the limits of the contour of a single blacked-out patch 14' or the set of blacker-out patches 14" created on the master so that either patch occupies a minimum amount of space on the copies in order to minimize the obstruction of constant information 12 appearing on the original document S.

In this regard, FIGS. 5 and 6 differ only in the steps 204, 206, 210 and 204', 206', 210', respectively, in sorting the variable information data sets to arrive at the size and shape of the respective single or multiple templates 14' and 14", respectively. FIG. 5 illustrates the steps in the formatting of a single template for the patch 14' to accommodate the longest character lines as printed among all of the names, street addresses and cities, states and zip codes found in the set of VIEW data items loaded in the temporary memory 132. Thus, in accordance with FIG. 5, the upper right point b is set to the shortest distance a–b sufficient to print the longest of the three character lines. FIG. 6 illustrates those steps in the formatting of a template 14" for the three blacked-out patches 14A"–14C" which, for each patch, is sufficient in distance a–b to accommodate the longest character line among the respective sets of character lines, thereby arriving at the left margins for each of the three patches. The following describes the operation of the apparatus in both of the patch creation modes illustrated in FIGS. 5 and 6.

The set of variable data items is desired to be printed generally within the area a, b, c, d, but occupying only that or those minimal portions of the area that correspond to the largest variable information data item in the set (which may be a set of 1), particularly starting at the left margin of the print at point a with successive lines printed from that margin. With the location of point a defined, a prompt may be provided to enter the set of variable information data items (steps 202, 202') and the number of duplicate copies (if greater than a single copy). The display 153 facilitates insertion of the variable information by highlighting the area to receive same as the display illustrates the size of the copy sheet and outlines of the area to receive the variable information. Note that usually the copy sheet size and original size will be the same, but the machine also may be programmed to provide a display of the copy sheet on the display 153 to show where the variable information will go into reproductions of differing size.

Following the input of the set of variable information data items from the disk drive or other data generator 152, the program sorts the data items to identify a composite or hypothetical "worst case" variable information item in the set that, if printed, would occupy the greatest amount of space within the general area a, b, c, d (steps 204, 204'). Preferably, the program will thus sort by character line (in the example having the three lines of print) in order to select and display the sorted largest data set on the display CP in the indicated copy space. The operator can then judge how the printed data will appear and may reset and restart the process of defining the general area if the minimal sized template to accommodate all of the VIEW data items in the set still obscures important constant information.

For example, and in reference to the method steps illustrated in FIG. 5, the data items may comprise names and addresses confined to three lines of varying length depending on the information to be printed. Each line would be formatted to begin at a common left margin point a defined by the selection of coordinates $X_1$, $Y_1$, and the template will comprise a single blacked-out rectangular area. The dimensions of this rectangular area, arrived at in accordance with the method steps of FIG. 5, will be wide enough in the a–b direction to handle the longest line of character data among all three lines of all data items and will be of sufficient height in the a–d direction for three or, if needed, more lines of character data. Of course, in analyzing the data for each line to determine the longest printed character line, trailing blanks, i.e., blank spaces at the end of the line are not counted. These operations are summarized in steps 204 and 206 of FIG. 5.

In the same fashion, if the patch creation mode of FIG. 6 is selected, the variable information data items are sorted and compared so that each separate linear patch 14A", 14B", 14C" of the template 14" corresponds to the longest printed character line in the direction a–b in steps 204' and 206'. There may be n patches formatted by n sets of x, y coordinate data corresponding to the longest line of characters to be printed in each of the n lines of variable address information.

After the formatting steps illustrated in FIGS. 5 or 6 are completed and the operator is satisfied that the patch (or patches) displayed on the screen is not likely to obscure information on the document, the operator ceases defining the location of the blacked-out template and is prompted to place the document sheet S face down upon the exposure platen 102 or to feed same to the platen via a recirculating feeder or document positioner (step 212). The printing of the master copy is thus commenced and proceeds in accordance with the steps illustrated in FIG. 7.

The document sheet S is then flash exposed onto image frame $E_1$ as shown in FIG. 4 in step 214. No exposure of the document sheet S is made on image frame $E_2$; instead the LCU 131 drives the appropriate LEDs via signals from drivers 148 (FIG. 4) to erase charge from all areas of image frame $E_2$ except for the area(s) which corresponds to the template 14' or 14" (step 216). The order of making the master may be reversed with image frame $E_2$, receiving the constant information and image frame $E_1$ being used to form the patch. It is also preferred to use the LED array to erase charge on the image frame E, receiving the optical exposure of the documents in the area(s) corresponding to the template to prevent development of this area(s) on such image frame. Thereafter, the two image frames $E_1$, $E_2$ are toned in step 218 at development station 119 and are transferred in registration to the same surface of a receiver sheet S either in the manner described in the '128 patent or as described in U.S. Pat. No. 5,113,222. The timing of actuation of the feeder 126 is controlled by the LCU so that the fed receiver sheet S' from supply 123a or 123b reaches the web 105 with its leading edge in registration with the leading edge of the image sector containing the first developed image frame $E_1$ which in this instance contains the toned information from the document that is to be optically copied. The receiver sheet S' travels with the web 105 beneath the first transfer corona charger 121a located adjacent to the periphery of the web travel path on the same side of the web as the receiver sheet. The corona charger 121a has an impressed D.C. voltage sufficient to produce an ion flow which charges the receiver sheet to the extent that toner particles of the first developed image are attracted from the web to the receiver sheet.

In order to register the receiver sheet with the next developed image on image frame $E_2$, the receiver sheet is removed from the web and then returned into contact with the web as the area bearing the next image reaches the location where the receiver sheet is returned to the web. Specifically, removal and return of the receiver sheet is accomplished by register means located downstream of the detack and transfer corona chargers 121a, 121b. The register means may operate, for example, by having the sheet S' pass through the fuser rollers 127 to fuse the image of the optical document. The sheet S' is then passed to an intermediate tray, such as duplex tray DT. Thereafter, the sheet S' is returned from tray DT in timed relation with movement of the web and the image frame $E_2$ to transfer developed image frame $E_2$ in register with the image frame $E_1$. In this example, image frame $E_2$ contains a toned area of the black patch that is to be created and superimposed on the image of the document. In this regard, the space between image frames $E_1$ and $E_2$ on the web will be greater than shown on FIG. 4 since provision must be made for the rather long path the sheet S' must travel in order to be brought back into engagement with the web to pick-up or transfer the developed image onto image frame $E_2$. As used herein, the two image frames used to produce the patch may be spaced apart on the web (or a drum photo conductor if used) or spaced apart in time if the same area on the web is used for image frames $E_1$ and $E_2$.

The web and the registered receiver sheet S' then travel beneath the detack and transfer corona chargers 121a and 121b located adjacent to the periphery of the web travel path on the same side of the travel path as the receiver sheet. The corona chargers transfer the second developed image in register to the receiver sheet S'. The voltages impressed upon the corona chargers 121a and 121b are controlled by the LCU. Since the second image on the web is in register with the first image on the receiver sheet, accurate superimposed transfer of the second image onto the same surface of the receiver sheet relative to the first image occurs.

After the transfer of the second image is complete, the receiver sheet S' is again detached from the web 105 and moved along a path away from the web by the sheet transfer apparatus that includes, for example, a vacuum transport apparatus 165. The transport 165 may engage the receiver sheet on the opposite side from the toner image so as not to disturb or smear the toner image. The vacuum transport 165 again delivers the sheet to the fixing apparatus such as, for example, roller fuser 127. The fuser 127 applies heat and pressure to the composite toner image and receiver sheet to fuse the toner image and permanently fix the second image to the receiver sheet which contains the previously fused first image. The receiver sheet S' is then delivered to an exit hopper or tray 170. While the image is being fixed to the receiver sheet, the web 105 continues to travel about its path through cleaning area 125, as described previously. These operations are summarized in step 220 of FIG. 7.

The intermediate master 10' or 10" (shown in FIG. 1C or 1D) so produced contains the constant information of document S and a blacked-out template 14' or 14" corresponding to the area of the largest single VIEW addressee data item determined as described above in reference to FIG. 5 or of the composite VIEW addressee line data items as described above in reference to FIG. 6. This master 10' or 10" may now be placed on the exposure platen 102 face down and used as the marked copy for producing reproductions containing a composite of constant image information and the set of variable image information data items in the manner illustrated in FIG. 8, starting with step 224.

The operator next places the master 10' or 10" on the exposure platen 102 face down with the document sheet appropriately registered such as with an edge suitably centered against a registration edge on the platen or with some copiers registered with a corner (step 224). The number of copies to be made will typically be the number of items in the mail list, but this may be overridden by the operator. The copier may be programmed so that menu prompts are provided to in requesting the variable information data set for each copy may also request the number of copies of that copy having that particular variable information. Normally, one copy of each will be desired and can be provided as a default if another number is not input. However, there may be times where different numbers of each copy are desired.

A PRINT or START button is depressed which in this mode signals the LCU 13 to make the copies using the set of VIEW data items previously inputted in temporary memory 132. The reproductions are then made in the manner described in the above-incorporated '128 patent and summarized in the steps 230–236 of FIG. 8.

Thus, an apparatus and method are provided wherein each image frame is exposed to a flash full-frame exposure of the constant image information of document S and the LED print head provides a variable information input on the same in the area masked off from exposure by the custom sized template. The minimization of the area in each frame to receive the variable information enhances the appearance and can increase the information content of the resulting copies. Also the use of flash exposure of the image frame for the constant information and exposure of the image frame with the variable exposure provides for reproductions at the full machine rate of the apparatus and thus provides for a highly productive reproduction apparatus.

Although the invention has been described with reference to a belt or web photoconductor, the invention is also useful with copiers having a drum-type photoconductor. Also, description is provided of use of different image frames to produce the master with the patch. It will be appreciated, however, that where smaller photoconductors are used, the same area may be used to produce the different images that are formed into a composite of the optical image information and the patch but these images are formed at different times.

The invention has been described in detail with particular reference to preferred embodiments thereof, but it will be understood that variations and modifications can be effected within its spirit and scope of the invention.

What is claimed is:

1. A method for producing a master from which a set of copies may be made that are a composite of constant information from an original document and a set of additional variable information data items, which, when printed, occupy variable spatial areas, the method comprising the steps of:

processing in a control unit the set of variable information data items comprising a plurality of lines of character information that vary in numbers of characters and print length so that said control unit identifies in response to said character information a spatial area in which the set of information data items to be printed may be printed;

operation, in response to identification by said control unit of the spatial area, said control unit to format a patch corresponding to the spatial area sufficient to accommodate the set of additional variable information data items to be printed; and printing a master having the patch superimposed on a reproduction of the constant information on the original document.

2. The method of claim 1 and further comprising:

comparing data items in the set by the print length of all lines of characters to determine a spatial area sufficient for all such lines of characters; and storing x, y coordinate signals identifying the outline of the patch as a single patch for all of the lines of characters.

3. The method of claim 2 wherein the printing step further comprises:

locating the original document containing the constant information on an exposure platen;

optically exposing the original document onto an image frame of an electrostatically charged photoconductive member to form an electrostatic latent image of the constant information;

separately exposing an electrostatic latent image of the patch on an image frame of the electrostatically charged photoconductive member corresponding to the area defined by the x, y coordinate signals;

developing the electrostatic latent images on the image frames formed in the optical and separate exposing steps; and transferring the two developed image frames in registration to the same surface of a receiver sheet to form a master having the constant information and the patch thereon.

4. The method of claim 1 and further comprising:

comparing data items in the set by the printed character line lengths of each line of characters to determine a respective plurality of patch lengths sufficiently long for each line of the plurality of lines of characters; and storing x, y coordinate signals identifying the outline of each patch for each line of characters corresponding to a plurality of lines having lengths corresponding to the lines of greatest print length among those lines in the set of data items.

5. The method of claim 4 wherein the printing step further comprises the steps of:

locating the original document containing the constant information on an exposure platen;

optically exposing the original document onto one image frame of an electrostatically charged photoconductive member to form an electrostatic latent image of the constant information;

separately exposing an electrostatic latent image of each patch on an image frame of the electrostatically charged photoconductive member corresponding to the area defined by the x, y coordinate signals;

developing the electrostatic latent images on the image frames formed in the optical and separate exposing steps; and transferring the two developed image frames in registration to the same surface of a receiver sheet to form a master having the constant information and the patches thereon.

6. The method of claim 1 wherein the printing step further comprises the steps of:

optically exposing the original document having constant information onto an image frame of an electrostatically charged photoconductive member to form an electrostatic latent image of the document;

separately exposing onto a second image frame, using an electronic print source, an electrostatic latent image of the formatted patch;

developing the latent images formed on the two image frames; and transferring the developed images to a receiver sheet to form the master with a composite of the constant information and the patch.

7. The method of claim 1 wherein the master is employed to make the set of copies, the copying method comprising:

placing the master on an optical exposure platen optically exposing the master onto an image frame of an electrostatically charged photoconductive member to form an electrostatic latent image of the master;

generating a set of print control signals corresponding to a subset of variable information data items in the set of data items to be printed on the copies;

selecting a print control signal;

separately exposing, using an electronic print source, onto the image frame of the electrostatically charged photoconductive member, an electrostatic latent image of character information corresponding to the subset of variable information data items in the area of the frame corresponding to the patch;

developing the latent images formed on the image frame;

transferring the developed image to a receiver sheet to form the copy with composite information of the master and the subset of variable information data items; and repeating the selecting, separately exposing, developing and transferring steps until all copies for all data items in the set are completed.

8. The method of claim 1 wherein the set of additional variable information data items constitutes character information to be printed in a plurality n of lines of print, wherein the n lines vary in number of characters and print length and further comprising:

comparing data items in the set by the print lengths of all of the n lines of characters to determine a minimal length of the patch for printing all the lines of characters of the set of data items;

storing x, y coordinate signals identifying the outline of the patch as a single patch having a length great enough to accommodate the printing of the longest line of characters; and employing the x, y coordinate signals in the printing of the patch on the master.

9. The method of claim 1 wherein the set of additional variable information data items constitutes character information to be printed in a plurality n of lines of print, wherein the n lines vary in number of characters and print length, and further comprising:

comparing each data item by the print lengths of each of the n lines of characters, to determine a minimal area of a patch for each respective line of characters;

storing x, y coordinate signals identifying the outlines of the n patches corresponding to the n lines, whereby the patches have lengths corresponding to the lines of greatest print length among those lines in the set of data items; and employing the n sets of x, y coordinate signals in the printing of the n patches on the master.

10. Apparatus for producing a master which may be employed to produce copy that is a composite of constant information from an original document and additional variable information included in a set of variable information data items which, when printed, occupy variable spatial areas, the master including at least one patch corresponding to the area to receive the variable information on copies made from the master and the additional variable information, the apparatus comprising:

digitizing means for supporting the document and for enabling the operator to manually select at least one point to identify the general area in which variable information is to appear on the copies and to generate a first set of signals that are related to the x, y coordinates of each of such points relative to a reference;

means for analyzing the set of data items corresponding to variable information to be printed on the copies and deriving a second set of x, y coordinate signals defining the outline of at least one area in which the largest to be printed character information in the data items may be printed;

an exposure platen;

a photoconductive member on which images may be formed in image frames;

means for electrostatically charging the photoconductive member;

exposure means for optically exposing the original document onto an image frame of the electrostatically charged photoconductive member to form an electrostatic latent image of the constant information;

means responsive to the second set of x, y signals for electronically exposing, on an image frame, an electrostatic latent image of at least one patch within an area of the frame related to the first set of x, y coordinate signals;

means for developing the latent images;

means for transferring the developed images to a receiver sheet to form a master with the composite constant information and the template reproduced thereon;

means for transporting the photoconductive member past the exposure means, the electronic print source means, the developing means and the transferring means; and means for providing receiver sheets to the transferring means.

11. The apparatus of claim 10 further comprising:

means forming the master with the constant information and at least one patch by exposing a document having the constant information onto one image frame of the photoconductive member using the optical exposure means to form a latent electrostatic image of the constant information and exposing a second image frame using the electronic print source to erase areas thereof, except for the area defined by the second set of coordinate signals corresponding to where the patch is to be reproduced; and registration means for operating said transporting means and receiver sheet providing means for presenting the first and second image frames to said transferring means for transferring the developed first and second images in registration onto said receiver sheet.

12. The apparatus of claim 11 for producing copy that is a composite of constant information from the original document and additional variable information, wherein the master formed by the apparatus of claim 18 is employed with the set of variable information data items, the apparatus further comprising:

means for repetitively operating the optical exposure means for exposing the master onto one image frame of the electrostatically charged photoconductive member to form a series of electrostatic latent images of the constant information and at least one patch;

means responsive to the set of variable information data items for repetitively exposing, using the electronic print source, onto second image frames of the electrostatically charged photoconductive member, images of the character information of each data item to erase charge from all areas thereof except for charge corresponding to the character information in an area corresponding to that of the patch;

means for operating the developing means for developing each latent images formed on the image frames containing the constant information and the character information printed by the electronic print source; and means for operating the registration and sheet providing means for transferring each developed images of the constant information and character information to a receiver sheet to form each copy with the composite information.

13. The apparatus of claim 10 for producing copy that is a composite of constant information from an original document and additional variable information, wherein the master formed by the apparatus of claim 10 is employed with the set of variable information data items, the apparatus further comprising:

means for repetitively operating the optical exposure means for exposing the master onto one image frame of the electrostatically charged photoconductive member to form the latent master image of the constant information and at least one patch;

means responsive to the set of variable information data items for repetitively exposing, using the electronic print source, onto each of the repetitively exposed master image frames, an electrostatic latent image of the character information of each data item in the area of the master image frame corresponding to at least one patch, to erase charge from all areas thereof except for charge corresponding to the character information and form a composite image frame;

means for operating the developing means for developing the latent image formed on each composite image frame containing the constant information and the character information printed by the electronic print source; and means for operating the transferring and sheet providing means for transferring each developed composite image to a receiver sheet to form the copy with the composite information.

* * * * *